United States Patent
Katase et al.

(10) Patent No.: US 9,108,861 B2
(45) Date of Patent: *Aug. 18, 2015

(54) TIN(II) OXIDE POWDER FOR REPLENISHING TIN COMPONENT OF TIN-ALLOY PLATING SOLUTION AND METHOD FOR MANUFACTURING SAID POWDER

(75) Inventors: Takuma Katase, Sanda (JP); Akihiro Masuda, Sanda (JP); Kanji Kuba, Iwaki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/115,366

(22) PCT Filed: May 8, 2012

(86) PCT No.: PCT/JP2012/061703
§ 371 (c)(1),
(2), (4) Date: Jan. 9, 2014

(87) PCT Pub. No.: WO2012/153716
PCT Pub. Date: Nov. 15, 2012

(65) Prior Publication Data
US 2014/0127109 A1    May 8, 2014

(30) Foreign Application Priority Data

May 10, 2011    (JP) ................. 2011-104953

(51) Int. Cl.
| | |
|---|---|
| *C01G 19/02* | (2006.01) |
| *C25D 21/18* | (2006.01) |
| *C25D 3/30* | (2006.01) |

(52) U.S. Cl.
CPC ............. *C01G 19/02* (2013.01); *C25D 21/18* (2013.01); *C01P 2004/61* (2013.01); *C01P 2006/11* (2013.01); *C01P 2006/12* (2013.01); *C01P 2006/80* (2013.01); *C25D 3/30* (2013.01)

(58) Field of Classification Search
None
See application file for complete search history.

(56) References Cited

U.S. PATENT DOCUMENTS 8,501,293 B2 *  8/2013  Grandbois ............... 428/35.8
2003/0150743 A1  8/2003  Obata et al.

FOREIGN PATENT DOCUMENTS

| CN | 101367543 A * | 2/2009 |
|---|---|---|
| CN | 101665266 A | 3/2010 |

(Continued)

OTHER PUBLICATIONS

Translation of Japan 11-310415, Nov. 1999.*

(Continued)

*Primary Examiner* — Steven Bos
(74) *Attorney, Agent, or Firm* — Locke Lord LLP; James E. Armstrong, IV

(57) ABSTRACT

An object and a problem of the present invention is to provide tin(II) oxide powder which has extremely high solubility in an acid or an acidic plating solution and excellent in storage stability in the air. The tin(II) oxide powder of the present invention is for replenishing a tin component of a tin-alloy plating solution, and comprises 100 to 5000 ppm of an antioxidant being contained in the powder with a mass ratio, and has such a dissolution rate that when 0.1 g of the tin(II) oxide powder is added to 100 ml of 100 g/L aqueous alkylsulfonic acid solution at a temperature of 25° C. and stirred, then the powder dissolves therein within 180 seconds.

7 Claims, 1 Drawing Sheet

(56) References Cited

FOREIGN PATENT DOCUMENTS

| | | | |
|---|---|---|---|
| CN | 101665266 A | * | 3/2010 |
| JP | 04-097911 A | | 3/1992 |
| JP | 11-310415 A | | 11/1999 |
| JP | 2003-096590 A | | 4/2003 |
| JP | 2009-132570 A | | 6/2009 |
| JP | 2009-132571 A | | 6/2009 |

OTHER PUBLICATIONS

Translation of Japan 04-097911, Mar. 1992.*

The Notification of the First Office Action dated Jun. 30, 2014, issued for the Chinese patent application No. 201280012025.2 and English translation thereof.

International Search Report dated Jul. 10, 2012, issued for PCT/JP2012/061703.

Hongfa Zhu et.al., "Elements of the carbon group and the compounds thereof," A Handbook of Catalyst, first printing and first edition in Aug. of 2008, p. 128, information sheets and English translation of p. 128.

Second Office Action dated Feb. 27, 2015, issued for the Chinese patent application No. 201280012025.2 and English translation thereof.

Supplementary European Search Report dated Sep. 25, 2014, issued for the European patent application No. 12782858.0.

Office Action dated Mar. 23, 2015, issued for the Taiwan patent application No. 101114527 and English translation thereof.

Notice of Reasons for Refusal mailed Jun. 9, 2015, issued for the corresponding Japanese patent application No. 2011-104953 and English translation thereof.

* cited by examiner

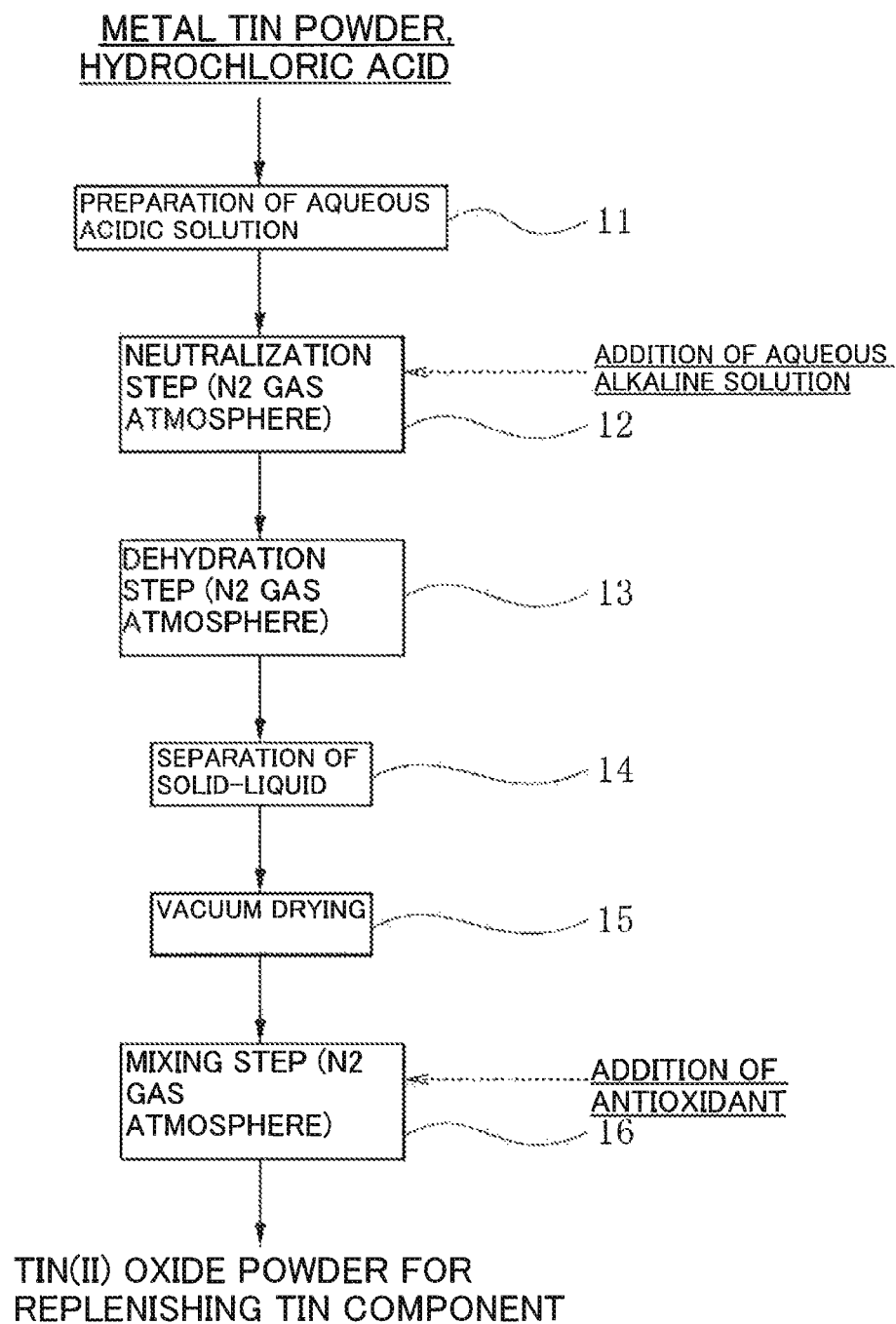

TIN(II) OXIDE POWDER FOR REPLENISHING TIN COMPONENT OF TIN-ALLOY PLATING SOLUTION AND METHOD FOR MANUFACTURING SAID POWDER

CROSS REFERENCE TO RELATED APPLICATIONS

This application is related to co-pending application: "METHOD FOR MANUFACTURING TIN(II) OXIDE POWDER FOR REPLENISHING TIN COMPONENT OF TIN-ALLOY PLATING SOLUTION, AND TIN (II) OXIDE POWDER MANUFACTURED USING SAID METHOD" filed even date herewith in the names of Takuma Katase, Akihiro Masuda and Kanji Kuba as a national phase entry of PCT/JP2012/061702, which application is assigned to the assignee of the present application and is incorporated by reference herein.

TECHNICAL FIELD

The present invention relates to tin (II) oxide (stannous oxide) powder and a method for manufacturing said powder suitable for replenishing a tin component to a tin-alloy plating solution. Specifically, it relates to tin (II) oxide powder excellent in solubility in an acid or an acidic plating solution and storage stability, and a method for manufacturing the powder.

BACKGROUND ART

A Pb—Sn alloy plating solution has been widely used until now for plating to electronic devices for which soldering was necessary or for the formation of a solder bump electrode (bump) to a semiconductor wafer, etc. However, the Pb—Sn alloy plating solution contains toxic Ph, so that there are many problems in a wastewater treatment, environmental conservation, or a soil and groundwater pollution from wastes of the semiconductors, etc. In recent years, for the purpose of reducing such a burden on the environment, researches have been carried out as a substitute for the Pb—Sn alloy plating solution containing lead, on a plating solution using a binary alloy which utilizes tin as a first element and uses silver, bismuth, copper, indium, antimony, zinc, etc., as, a second element, or a multicomponent alloy to which a third element is further added, and among these, a Sn—Ag plating solution is now becoming a main stream. as a Ph-free plating solution.

In an electroplating process using the Pb—Sn alloy plating solution, however, when an anode (an anode of the electroplating process) made of Pb—Sn is used, $Pb^{2+}$ and $Sn^{2+}$ ions are dissolved from the anode into the plating solution, so that the balance of the components of the Pb—Sn alloy plating solution is kept substantially constant. On the other hand, in the electroplating process using, for example, a Sn—Ag plating solution, when an anode made of Sn—Ag is used, Ag is gradually precipitated on the surface of the anode to coat the surface of the anode, so that $Sn^{2+}$ ion is not replenished. from the anode to the plating solution. Thus, a balance of components of the plating solution is changed, whereby it causes a problem in the electroplating process using an anode made of Sn—Ag in the Sn—Ag plating solution. Therefore, in the electroplating process using a Sn—Ag plating solution, an insoluble platinum-plated titanium plate, etc. is used as an anode.

Also, when an insoluble anode is used, for replenishing components of the plating solution, a method in which a metal tin is supplied by dissolving in the plating solution can be considered. According to this method, however, in the case of an alloy plating with a metal which is nobler than tin, a noble metal is precipitated on the surface of the metal tin by substituting it in the plating solution so that there is a problem that dissolution of the metal tin is suppressed. Thus, replenishment has generally been carried out by adding a tin salt solution in which essential components of the plating solution had previously been dissolved (for example, see Patent Document 1.).

However, as described in the above-mentioned Patent Document 1, in the method in which $Sn^{2+}$ ion is replenished by injecting a tin salt solution, etc. (hereinafter referred to as an "element solution") where essential components of the plating solution are dissolved therein, it must prepare the element solution to be injected, and the element solution must be injected while analyzing the components of the plating solution whereby control of the plating solution is difficult and also a large cost is necessary.

To overcome the above-mentioned problems, it has been investigated a method in which tin (II) oxide powder having an extremely high solubility in an acid or an acidic plating solution is directly added to the plating solution whereby the tin component in the plating solution is replenished (for example, see Patent Document 2.).

PRIOR ART REFERENCES

Patent Documents

Patent Document 1: JP 2003-96590A (paragraph [0028])
Patent Document 2: JP 2009-132571A (claim 1, paragraph [0008])

SUMMARY OF THE INVENTION

Problems to be Solved by the Invention

However, the tin (II) oxide powder to be used in the replenishing method shown in the above-mentioned Patent Document 2 has a small average particle diameter and a large specific surface area, so that the surface of the tin (II) oxide powder is likely oxidized from SnO to $SnO_2$ when it is exposed to the air. Solubility in an acid or an acidic plating solution of the tin (II) oxide powder whose powder surface has been oxidized to $SnO_2$ is markedly lowered, so that it is necessary to store the powder in a vacuum pack, etc., from immediately after manufacturing the powder to just before using the same, and after opening thereof, it is necessary to use the whole amount promptly. Therefore, a further improvement has been desired in the aspect of storage and control or handling thereof by applying a certain measure or treatment to the tin (II) oxide powder, etc.

On the other hand, extremely high solubility in an acid or an acidic plating solution is required to the tin (II) oxide powder to be used in the replenishing method in which the above-mentioned tin (II) oxide powder is directly added to the plating solution. This is because, if tin (II) oxide powder having a low solubility is used in this replenishing method, the tin (II) oxide powder is not sufficiently dissolved in the plating solution when it is added to the plating solution, and precipitates are gradually generated in the plating solution as a sludge containing insoluble tin (IV) oxide (stannic oxide) whereby replenishment of the $Sn^{2+}$ ion becomes difficult. Therefore, when a certain measure for preventing oxidation is to be applied to the tin (II) oxide powder to be used in this replenishing method, it must be carried out without impairing high solubility of the powder in an acid or an acidic plating solution, whereby it is extremely difficult to coexist the two characteristics.

If the sludge is generated, replenishment of the $Sn^{2+}$ ion becomes difficult, and it causes inconvenience that a piping or a filter of a plating treatment device is clogged, or the sludge is attached to the plated surface to lower the quality of the plated surface.

An object of the present invention is to provide tin (II) oxide powder having extremely high solubility in an acid or an acidic plating solution and excellent storage stability in the air, and a method for manufacturing the same.

Means for Solving the Problems

A first aspect of the present invention is tin (II) oxide powder for replenishing a tin component of a tin-alloy plating solution, which comprises 100 to 5000 ppm of an antioxidant being contained in the powder with a mass ratio, and has such a dissolution rate that when 0.1 g of the tin (II) oxide powder is added to 100 ml of 100 g/L aqueous alkylsulfonic acid solution at a temperature of 25° C. and stirred, then the powder completely dissolves therein within 180 seconds.

A second aspect of the present invention is an invention based on the first aspect, wherein the antioxidant is at least one selected from the group consisting of glyceraldehyde, phenylhydrazine, sodium borohydride, potassium borohydride, lithium borohydride, tetrahydrofuran-borane complex, dimethylamine-borane complex, diphenylamine-borane complex and pyridine-borane complex.

A third aspect of the present invention is an invention based on the first or the second aspect, and as shown in FIG. 1, it relates to a method for manufacturing the tin (II) oxide powder for replenishing tin component of tin-alloy plating solution which comprises Step 11 of preparing an aqueous acidic solution containing $Sn^{2+}$ ions, Step 12 of neutralizing the aqueous acidic solution by adding an aqueous alkaline solution to prepare a slurry of tin (II) hydroxide (stannous hydroxide), Step 13 of dehydrating the prepared slurry to obtain a slurry of tin (II) oxide, Step 14 of separating the slurry of tin (II) oxide into a solid and a liquid to obtain tin (II) oxide, Step 15 of vacuum drying the obtained tin (II) oxide, and Step 16 of mixing an antioxidant powder with the tin (II) oxide.

Effects of the Invention

The tin (II) oxide powder of the first aspect of the present invention is tin (II) oxide powder for replenishing a tin component of a tin-alloy plating solution, and an antioxidant is contained in the powder with a mass ratio of 100 to 5000 ppm. According to this constitution, the powder shows extremely high solubility in an acid or an acidic plating solution, and excellent storage stability in the air. Specifically, it shows such a dissolution rate that when 0.1 g of the tin (II) oxide powder is added to 100 ml of 100 g/L aqueous alkylsulfonic acid solution at a temperature of 25° C. and stirred, then the powder completely dissolves therein within 180 seconds.

In the tin (II) oxide powder of the second aspect of the present invention, at least one selected from the group consisting of glyceraldehyde, phenylhydrazine, sodium borohydride, potassium borohydride, lithium borohydride, tetrahydrofuran-borane complex, dimethylamine-borane complex, diphenylamine-borane complex and pyridine-borane complex is used as the antioxidant. By using the above-mentioned antioxidant, it is possible to prevent from worsening the solubility of the SnO powder by being oxidized during the storage, whereby the $Sn^{2+}$ on can be stably replenished to the plating solution.

The manufacturing method of the third aspect of the present invention includes steps of: preparing an aqueous acidic solution containing $Sn^{2+}$ ions; neutralizing the aqueous acidic solution by adding an aqueous alkaline solution to prepare a slurry of tin (II) hydroxide; dehydrating the prepared slurry to obtain a slurry of tin (II) oxide; separating the slurry of the tin (II) oxide into a solid and a liquid to obtain tin (II) oxide; vacuum drying the obtained tin (II) oxide; and mixing an antioxidant powder with the tin (II) oxide. According to this constitution, tin (II) oxide powder having high solubility in an acid or an acidic plating solution and excellent storage stability in the air can be manufactured.

BRIEF DESCRIPTION OF THE DRAWING

FIG. 1 is a flow chart showing a method for manufacturing tin (II) oxide powder for replenishing a tin component to a tin-alloy plating solution of the present invention.

EMBODIMENTS OF THE INVENTION

Next, an embodiment to carry out the present invention is explained by referring to the drawing.

In the method for manufacturing the tin (II) oxide powder of the present invention, an aqueous acidic solution containing $Sn^{2+}$ ions is firstly prepared (Step 11). The preparation method of the above-mentioned aqueous acidic solution is not particularly limited, and there may be mentioned, for example, a method in which the metal tin powder is dissolved in hydrochloric acid. At this time, preferred concentration of the hydrochloric acid is 30 to 40% by mass and a temperature thereof is 80 to 100° C., and the metal tin powder is dissolved therein over 18 to 30 hours. The metal tin powder to be used preferably has an α-ray emitting amount of 0.05 cph/cm$^2$ or less. This is because, if the α-ray emitting amount exceeds 0.05 cph/cm$^2$, there are inconveniences that, for example, in a semiconductor, etc., there occurs a soft error, etc. in which the data in the memory are rewritten or the semiconductor may be destroyed because of the α-ray emitted from the solder bump electrode.

Next, an aqueous alkaline solution is added to the aqueous acidic solution prepared as mentioned above, and the mixture is stirred to neutralize them to prepare a slurry of tin (II) hydroxide (Step 12). The above-mentioned aqueous alkaline solution may be exemplified by an aqueous ammonia, an ammonium bicarbonate aqueous solution or a mixed solution thereof. Here, the neutralization step for preparing a slurry of the tin (II) hydroxide is preferably carried out in a nitrogen gas atmosphere. When the neutralization step is carried out in the nitrogen gas atmosphere, an effect can be obtained that the $Sn^{2+}$ ion in the aqueous acidic solution is prevented from being oxidized to tin (IV) oxide which is slightly soluble in an acid, as compared with the case where the step is carried out in the air. This is because, when the neutralization step is carried out in the nitrogen gas atmosphere in which no oxygen is present, dissolution of the oxygen into the slurry can be prevented.

When aqueous ammonia is to be added as an aqueous alkaline solution, a concentration of the aqueous ammonia to be used is preferably 20 to 30% by mass. If the concentration of the aqueous ammonia is less than the lower limit value, the neutralization reaction does not proceed sufficiently so that it is not preferred. On the other hand, if it exceeds the upper limit value, dehydration reaction of the tin (II) hydroxide proceeds rapidly, and a concentration of an anion component in the acid remained in the tin (II) oxide becomes high so that it is not preferred. The reason why aqueous ammonia is used as the aqueous alkaline solution is that it is suitable to control the particle diameter of the tin (II) oxide powder to be manufactured. As the aqueous alkaline solution, ammonium bicarbonate may be used alone, or an ammonium bicarbonate aqueous solution may be used by mixing with aqueous ammonia simultaneously. The neutralization reaction is carried out at a liquid temperature of the reaction mixture of 30 to 50° C., and preferably carried out at a pH range of 6 to 8. If the liquid temperature of the reaction solution is less than the lower limit value, a concentration of an anion component in the acid remained in the tin (II) oxide becomes high so that it is not preferred, while if it exceeds the upper limit value, the dehydration reaction of the tin (II) hydroxide proceeds with the progress of the neutralization reaction so that it is not preferred. The reason why the pH of the reaction solution is set to the above-mentioned range is that it is a suitable range in the points of progress of the neutralization reaction and readily-solubility of the manufactured powder. If the pH is less than the lower limit value, the neutralization reaction does not proceed sufficiently so that it is not preferred. While if it exceeds the upper limit value, a hardly soluble tin salt such as ammonium stannate and metal tin are formed whereby a yield is lowered or a much amount of components which are slightly soluble in the plating solution is contained so that it is not preferred.

Next, the slurry prepared as mentioned above is heated and kept to mature and dehydrate the tin (II) hydroxide, whereby a slurry of tin (II) oxide is obtained (Step 13). The dehydration step of obtaining a slurry of tin (II) oxide by dehydrating tin (II) hydroxide with heating and keeping the state is preferably carried out in a nitrogen gas atmosphere. By carrying out the dehydration step in the nitrogen gas atmosphere, an effect can be obtained that the tin (II) oxide in the slurry is prevented from being oxidized to tin (IV) oxide which is slightly soluble in an acid, as compared with the case where the step is carried out in the air as in the conventional procedure. This is because, when the dehydration step is carried out in the nitrogen gas atmosphere in which no oxygen is present in the atmosphere, dissolution of the oxygen into the slurry can be prevented. A temperature of heating and keeping the state is preferably 80 to 100° C. If the temperature of heating and keeping the state is less than the lower limit value, dehydration of the tin (II) hydroxide does not proceed sufficiently, and white-colored tin (II) hydroxide is remained in the reaction system so that it is not preferred. On the other hand, it is physically impossible to heat the reaction solution at a temperature higher than the boiling point of water under atmospheric pressure conditions. A time of heating and keeping the state may vary depending on an amount of the slurry or a temperature of heating and keeping the state, and is preferably 1 to 2 hours.

Then, the above-mentioned slurry of the tin(II) oxide is separated into a solid and a liquid by filtration, centrifugation, etc., to obtain the solid component of tin(II) oxide (Step 14). The obtained tin(II) oxide is vacuum dried (Step 15). The reasons why the drying is carried out by vacuum drying are to prevent from oxidation of the tin(II) oxide powder during the drying, to prevent from aggregation of the powder particles.

Thereafter, the dried tin (II) oxide powder is mixed with an antioxidant powder (Step 16). The antioxidant is preferably at least one selected from the group consisting of glyceraldehyde, phenylhydrazine, sodium borohydride, potassium borohydride, lithium borohydride, tetrahydrofuran-borane complex, dimethylamine-borane complex, diphenylamine-borane complex and pyridine-borane complex. The above-mentioned antioxidants do not dissolve in the plating solution (glyceraldehyde, phenylhydrazine), or decompose in the plating solution (sodium borohydride, potassium borohydride, lithium borohydride, tetrahydrofuran-borane complex, dimethylamine-borane complex, diphenylamine-borane complex, pyridine-borane complex), so that they can provide an anti-oxidative property without causing any bad effects on the solubility of the tin (II) oxide powder in an acid or an acidic plating solution. The antioxidant is to be mixed so that it is contained in the resulting powder with a mass ratio of 100 to 5000 ppm.

According to the manufacturing method of the present invention as mentioned above, tin (II) oxide powder suitable for a method of directly adding tin (II) oxide powder to a plating solution can be manufactured as a method for replenishing a tin component to a tin-alloy plating solution.

The tin (II) oxide powder of the present invention obtained by the above-mentioned method contains the above-mentioned antioxidant in the powder with a mass ratio of 100 to 5000 ppm. Thus, even when the powder is stored in the state that it is exposed to the air, the surface of the tin (II) oxide powder is hardly oxidized from SnO to $SnO_2$, so that the powder after storage for a long period of time can maintain high solubility in an acid or an acidic plating solution. Therefore, by the addition of the tin (II) oxide powder, replenishment of $Sn^{2+}$ ion of the plating solution can be carried out sufficiently. If the content of the antioxidant contained in the powder is less than 100 ppm with a mass ratio, oxidation of the powder surface cannot be sufficiently prevented when the powder is stored in the air. In addition, an oxidation-preventive effect of the $Sn^{2+}$ ion replenished by adding to the plating solution cannot be sufficiently obtained. On the other hand, if it exceeds 5000 ppm, in addition to saturation of the oxidation-preventive effect, when the above-mentioned SnO is used for replenishing $Sn^{2+}$ ion, there occur inconveniences such as a fear of lowering plating property caused by introducing an excessive amount of the antioxidant into the plating solution, and a fear of clogging a filter due to insoluble antioxidant. Among these, the content of the antioxidant contained in the powder is preferably in the range of 1000 to 3000 ppm with a mass ratio.

The tin (II) oxide powder has an average particle diameter of 5 to 15 μm with $D_{50}$ value, a specific surface area of 0.4 to 3.5 $m^2/g$, and a tap density of 0.6 to 1.2 $g/cm^3$. The tin (II) oxide powder having an average particle diameter and a tap density within the above-mentioned ranges has extremely high solubility in an acid or an acidic plating solution, or is readily soluble in an acid or an acidic plating solution. As an index showing the solubility, a dissolution rate in an acid may be mentioned. Specifically, there may be obtained a dissolution rate in which 0.1 g of tin (II) oxide powder is added to 100 ml of 100 g/L aqueous alkylsulfonic acid solution at a temperature of 25° C. and stirred, then, it dissolves within 180 seconds. The tin (II) oxide powder subjected to the above-mentioned oxidation-preventive treatment forms extremely less amount of tin (IV) oxide at the powder surface. Thus, even when the tin (II) oxide powder is directly added to the plating solution without subjecting to adjustment of the element solution, it is dissolved in the plating solution immediately without generating a sludge, and a $Sn^{2+}$ ion component of the plating solution can be replenished.

The tin(II) oxide powder manufactured by the manufacturing method of the present invention is particularly excellent in solubility in an alkylsulfonic acid such as methanesulfonic acid, ethanesulfonic acid and 1-propanesulfonic acid each of which is a component of the acidic plating solution as an acid, and in an alloy plating solution comprising Sn and a metal which is nobler than Sn as an acidic plating solution such as Sn—Ag alloy plating solution, Sn—Cu alloy plating solution, Sn—Ag—Cu alloy plating solution and Au—Sn alloy plating solution.

EXAMPLES

Next, Examples of the present invention are explained in detail with Comparative Examples.

Example 1

First, 500 g of metal tin powder having an α-ray emitting amount of 0.0007 cph/cm$^2$ which is 0.05 cph/cm$^2$ or less was dissolved in 1000 g of hydrochloric acid with a concentration of 35% by mass and a temperature of 80° C. over 24 hours to prepare an aqueous acidic solution. Subsequently, in a tank filled with a nitrogen gas, an aqueous ammonia with a concentration of 30% by mass was added as an aqueous alkaline solution to the aqueous acidic solution while keeping the liquid temperature to 30° C. and a pH to 6, and the mixture was stirred to obtain a slurry of tin (II) hydroxide.

Then, the slurry of tin (II) hydroxide was heated under nitrogen gas atmosphere and kept to 90 to 100° C. for 8 hours to dehydrate the tin (II) hydroxide whereby a slurry of tin (II) oxide precipitates was obtained.

Next, the slurry of the tin (II) oxide precipitates was separated into a solid and a liquid by filtration to obtain the tin (II) oxide precipitates. The obtained tin (II) oxide precipitates were vacuum dried at a temperature of 25° C. to obtain 530 g of black-colored tin (II) oxide powder.

Further, a dimethylamine-borane complex ( particle diameter: 10 to 20 μm) was prepared as an antioxidant, and 0.053 g of the dimethylamine-borane complex was mixed with the above-mentioned tin(II) oxide powder to obtain tin(II) oxide powder for replenishing a tin component.

Example 2

Sodium borohydride (particle diameter: 10 to 30 μm) was prepared as an antioxidant, and tin(II) oxide powder for replenishing a tin component was obtained in the same manner as in Example 1 except that 0.054 g of sodium borohydride was mixed with 536 g of the black-colored tin(II) oxide powder obtained in the same manner as in Example 1.

Example 3

Tin (II) oxide powder for replenishing a tin component was obtained in the same manner as in Example 1 except that 2.65 g of glyceraldehyde was mixed with 529 g of the black-colored tin (II) oxide powder obtained in the same manner as in Example 1.

Example 4

Tin (II) oxide powder for replenishing a tin component was obtained in the same manner as in Example 1 except that 2.66 g of dimethylamine-borane complex was mixed with 532 g of the black-colored tin (II) oxide powder obtained in the same manner as in Example 1.

Example 5

Sodium borohydride (particle diameter: 10 to 30 μm) was prepared as an antioxidant, and tin(II) oxide powder for replenishing a tin component was obtained in the same manner as in Example 1 except that 2.65 g of sodium borohydride was mixed with 530 g of the black-colored tin(II) oxide powder obtained in the same manner as in Example 1.

Comparative Example 1

Without mixing any antioxidant, 536 g of the black colored tin (II) oxide powder obtained in the same manner as in Example 1 was used as tin (II) oxide powder for replenishing a tin component.

Comparative Example 2

Tin (II) oxide powder for replenishing a tin component was obtained in the same manner as in Example 1 except that 0.042 g of dimethylamine-borane complex was mixed with 528 g of the black-colored tin (II) oxide powder obtained in the same manner as in Example 1.

Comparative Example 3

Sodium borohydride (particle diameter: 10 to 30 μm) was prepared as an antioxidant, and tin(II) oxide powder for replenishing a tin component was obtained in the same manner as in Example 1 except that 0.042 g of sodium borohydride was mixed with 531 g of the black-colored tin(II) oxide powder obtained in the same manner as in Example 1.

Evaluation 1

With regard to the tin (II) oxide powders for replenishing a tin component obtained in Examples 1 to 5 and Comparative Examples 1 to 3, an average particle diameter ($D_{50}$), specific surface area and a tap density of the powders were measured. These results are shown in the following Table 1.

(1) Average particle diameter ($D_{50}$) of powder: it shows a volume cumulative median diameter measured by using a particle size distribution measuring apparatus (manufactured by NIKKISO CO. LTD., Name of Type: MICROTRAC MT3000 particle size analyzer).

(2) Specific surface area of powder: it shows a BET specific surface area by the BET single-point method measured by using a surface area measuring apparatus (manufactured by Mountech CO. Ltd., Name of Type: automatic specific surface area (BET) measuring apparatus HM-model-1201).

(3) Tap Density of Powder: it was measured by Metal powder-Tap density measuring method regulated by JIS Z2512: 2006.

TABLE 1

|  | | Tin(II) oxide powder | | | |
| --- | --- | --- | --- | --- | --- |
|  | Kind of Antioxidant | Content of Antioxidant [ppm] | Average particle diameter D50 [μm] | Specific surface area [m2/g] | Tap density [g/cm3] |
| Example 1 | Dimethylamine-borane complex | 100 | 8.0 | 0.5 | 0.9 |
| Example 2 | Sodium borohydride | 100 | 8.1 | 0.5 | 0.9 |

TABLE 1-continued

|  | Kind of Antioxidant | Tin(II) oxide powder | | | |
|---|---|---|---|---|---|
|  |  | Content of Antioxidant [ppm] | Average particle diameter D50 [μm] | Specific surface area [m2/g] | Tap density [g/cm3] |
| Example 3 | Glyceraldehyde | 5000 | 8.0 | 0.5 | 0.8 |
| Example 4 | Dimethylamine-borane complex | 5000 | 8.2 | 0.5 | 0.9 |
| Example 5 | Sodium borohydride | 5000 | 8.4 | 0.5 | 0.9 |
| Comparative Example 1 | — | — | 8.3 | 0.5 | 0.9 |
| Comparative Example 2 | Dimethylamine-borane complex | 80 | 8.1 | 0.5 | 0.9 |
| Comparative Example 3 | Sodium borohydride | 80 | 8.5 | 0.5 | 0.8 |

Comparative Test and Evaluation 2

With regard to tin (II) oxide powders of Examples 1 to 5 and Comparative Examples 1 to 3, each dissolution rate to 100 g/L alkylsulfonic acid was measured. Specifically, with regard to the tin (II) oxide powders of Examples 1 to 5 and Comparative Examples 1 to 3, two kinds of powders were each prepared one of which was manufactured on the day, and the other of which was stored at a temperature of 40° C. for 3 days in the air after the manufacture. The dissolution rates of these powders were measured according to the following mentioned procedure.

Each 0.1 g of the tin (II) oxide powder prepared as mentioned above was added to 100 ml of 100 g/L alkylsulfonic acid at a temperature of 25° C. as a solvent while stirring the mixture by using a stirrer with a rotation rate of 500 rpm, and a time from addition of the powder to confirmation of disappearance of the powder by visual observation was measured. These results are shown in the following Table 2.

TABLE 2

|  | Dissolution time [unit: sec] | |
|---|---|---|
|  | Manufactured day | After 3 days of 40° C. Treatment |
| Example 1 | 47 | 47 |
| Example 2 | 47 | 46 |
| Example 3 | 48 | 51 |
| Example 4 | 49 | 48 |
| Example 5 | 41 | 39 |
| Comparative Example 1 | 28 | Not completely dissolved |
| Comparative Example 2 | 29 | 201 |
| Comparative Example 3 | 30 | 189 |

As can be clearly seen from Table 1 and Table 2, the tin (II) oxide powders measured on the manufactured day had rapid dissolution rates in either of the powders of Examples 1 to 5 and Comparative Examples 1 to 3, and it could be confirmed to be each excellent in solubility. On the other hand, with regard to the tin (II) oxide powders after storage in the air for 3 days under 40° C. condition, the powder of Comparative Example 1 was markedly oxidized on the surface of the powder, so that it gave the result that the solubility thereof was remarkably impaired. In addition, in the powders of Comparative Examples 2 and 3, they gave the results that the dissolution rate became slower than those of the powders manufactured on the measured day. To the contrary, in the powders of Examples 1 to 5, it can be understood that oxidation on the surface of the powder could be suppressed even when they were stored in the air, no remarkable change in the dissolution rate was observed and high solubility could be maintained.

Utilizability in Industry

The tin (II) oxide powder of the present invention can be utilized for replenishing a tin component to a tin-alloy plating solution.

The invention claimed is:

1. Tin(II) oxide powder containing an antioxidant for replenishing a tin component of a tin-alloy plating solution, which is obtained by mixing a dried tin(II) oxide powder with the antioxidant and comprises 100 to 5000 ppm of the antioxidant contained in the tin(II) oxide powder and, has an average particle diameter $D_{50}$ of 5 to 15 μm, a specific surface area of 0.4 to 3.5 m$^2$/g, and a tap density of 0.6 to 1.2 g/cm$^3$, and has such a dissolution rate that when 0.1 g of the tin(II) oxide powder is added to 100 ml of 100 g/L aqueous alkylsulfonic acid solution at a temperature of 25° C. and stirred, the powder completely dissolves therein within 180 seconds.

2. The tin(II) oxide powder for replenishing a tin component of a tin-alloy plating solution according to claim 1, wherein the antioxidant is at least one selected from the group consisting of phenylhydrazine, sodium borohydride, potassium borohydride, lithium borohydride, tetrahydrofuran-borane complex, dimethylamine-borane complex, diphenylamine-borane complex and pyridine-borane complex.

3. The tin(II) oxide powder for replenishing a tin component of a tin-alloy plating solution according to claim 1, wherein 1000 to 3000 ppm of the antioxidant is contained in the powder.

4. The tin(II) oxide powder for replenishing a tin component of a tin-alloy plating solution according to claim 1, wherein the antioxidant is at least one selected from the group consisting of glyceraldehyde, phenylhydrazine, sodium borohydride, potassium borohydride, lithium borohydride, tetrahydrofuran-borane complex, dimethylamine-borane complex, diphenylamine-borane complex and pyridine-borane complex.

5. A method for manufacturing a tin(II) oxide powder for replenishing a tin component of a tin-alloy plating solution, comprising steps of:
preparing an aqueous acidic solution containing Sn$^{2+}$ ions;
neutralizing the aqueous acidic solution in a nitrogen gas atmosphere by adding an aqueous alkaline solution to prepare a slurry of tin(II) hydroxide;

dehydrating the tin(II) hydroxide by heating and keeping the prepared slurry in a nitrogen atmosphere to obtain a slurry of tin(II) oxide;

separating the slurry of tin(II) oxide into a solid and a liquid to obtain tin(II) oxide;

vacuum drying the tin(II) oxide to obtain a vacuum dried tin(II) oxide powder; and mixing an antioxidant powder with the vacuum dried tin(II) oxide powder to obtain the tin(II) oxide powder which comprises 100 to 5000 ppm of the antioxidant powder contained in the tin(II) oxide powder, wherein the tin(II) oxide powder for replenishing a tin component of a tin-alloy plating solution has an average particle diameter $D_{50}$ of 5 to 15 μm, a specific surface area of 0.4 to 3.5 $m^2$/g, and a tap density of 0.6 to 1.2 $g/cm^3$.

6. The method for manufacturing the tin(II) oxide powder for replenishing a tin component of a tin-alloy plating solution according to claim 5, wherein the antioxidant is at least one selected from the group consisting of phenylhydrazine, sodium borohydride, potassium borohydride, lithium borohydride, tetrahydrofuran-borane complex, dimethylamine-borane complex, diphenylamine-borane complex and pyridine-borane complex.

7. The method for manufacturing the tin(II) oxide powder for replenishing a tin component of a tin-alloy plating solution according to claim 5, wherein the antioxidant is at least one selected from the group consisting of glyceraldehyde, phenylhydrazine, sodium borohydride, potassium borohydride, lithium borohydride, tetrahydrofuran-borane complex, dimethylamine-borane complex, diphenylamine-borane complex and pyridine-borane complex.

* * * * *